United States Patent [19]
Fivaz et al.

[11] Patent Number: 4,614,038
[45] Date of Patent: Sep. 30, 1986

[54] HEAD FOR MEASURING DIAMETERS OF CYLINDRICAL PARTS

[75] Inventors: Robert Fivaz, Hauterive, Switzerland; Dieter Pfisterer, Stuttgart, Fed. Rep. of Germany; Hans Sigg, Neuchâtel, Switzerland

[73] Assignee: Meseltron, S.A, Corcelles, Switzerland

[21] Appl. No.: 772,082

[22] Filed: Sep. 3, 1985

[30] Foreign Application Priority Data

Sep. 4, 1984 [FR] France .................. 84 13691

[51] Int. Cl.⁴ .............................................. G01B 7/12
[52] U.S. Cl. .................. 33/149 J; 33/143 L; 33/148 H; 33/178 E
[58] Field of Search ............ 33/148 R, 143 R, 143 H, 33/143 L, 148 H, 149 R, 149 J, 178 R, 178 E

[56] References Cited
U.S. PATENT DOCUMENTS

| 2,419,461 | 4/1947 | Neff | 33/148 H |
| 2,772,484 | 12/1956 | Cargill et al. | 33/148 R |
| 3,974,569 | 8/1976 | Albertazzi | 33/178 R |
| 4,524,523 | 6/1985 | Golinelli et al. | 33/143 L |

Primary Examiner—Willis Little
Attorney, Agent, or Firm—Griffin, Branigan & Butler

[57] ABSTRACT

The measuring head intended for measuring diameters of cylindrical parts, e.g. parts being ground to diameter, comprises two measuring projections which are easily adjustable when a change is made from one diameter to another diameter, while maintaining excellent precision whatever the diameter concerned and the distance which separates the measuring head from the part to be machined. For this purpose, each of the measuring projections is a crank comprising a pivoted arm and a cylindrical rod projecting from the arm and forming a measuring contact element. The cranks are secured to an upper block and a lower block, respectively. A pick-up measures the distance existing between the blocks. The cranks are implemented in such manner that the axes of the rods always remain parallel to each other whatever the angle of rotation or adjustment of each of the arms. To facilitate adaptation of the cranks to the different nominal diameters which may arise, a conical joint is provided for the cranks at the location of the pivotal axes of the arms.

8 Claims, 2 Drawing Figures

HEAD FOR MEASURING DIAMETERS OF CYLINDRICAL PARTS

BACKGROUND OF THE INVENTION

1. Field of the Invention

The present invention relates to a measuring head intended for measuring diameters of cylindrical parts, in particular for controlling a machine for grinding outer cylindrical surfaces. The head is of the type comprising a support, an upper block and a lower block which are attached flexibly to said support and arranged to be able to move away from or nearer to one another while remaining aligned with one another, a transducer for measuring the distance between the blocks, and two measuring projections for resting on the cylindrical part to be measured, the projections being fast with said upper block and said lower block respectively.

2. Description of the Prior Art

A measuring head of this kind is known, for example, from German patent application published on Nov. 29th 1956 under Number Sch 17 246 Ib/67a. If reference is made to FIG. 1 of the mentioned document, there will be recognised a support to which an upper block and a lower block are flexibly attached by means of the spring leaves. The distance between the blocks is measured by a transducer located at the top of the drawing. Each of the blocks is equipped with a measuring projection and the diameter of the cylindrical part to be measured is sensed by the ends of the measuring projections or contact elements, which are formed of hard metal or diamond. In this way, the reduction in the diameter of the part caused by the operation of a grinding wheel is converted into an electric signal issuing from the pick-up. This signal can be used to display the size or only the reduction in size or for stopping the operation of the grinding wheel automatically when a predetermined size has been reached. Depending on the embodiment, the transducer may be inductive, optical or capacitive.

It will be noted that, for a given cylindrical part, the measuring range extends only over some tenths of a millimeter, since what is concerned here are grinding operations in which only little material is removed. However, the measuring head must be capable of adaptation to parts to be machined which have very different nominal dimensions. It is therefore necessary to be able to adjust the distance between the projections within a considerable bracket, for example of some millimetres to several centimetres. In the document mentioned, this problem has been solved by mounting the measuring projection on a rail in the form of a dovetail which can slide on another rail of opposite form constituting part of the block and provided with a rack. A toothed wheel controlled by an adjusting knob allows this adjustment. Once the said adjustment has been made, the entire arrangement is locked by means of a screw.

An arrangement very similar to that described above is shown in the document No. FR-A-1,268,074, in which we again find two blocks attached flexibly to a support. Here, however, the blocks are disposed side by side instead of being superposed one with respect to the other as in the preceding document. The document No. FR-A-1,268,074 makes use of a guide which bears a plate through which a screw can turn which is engaged in a slide capable of sliding on the guide and of being clamped thereto with the aid of a screw. The slide bears a projection on which is fixed a block which serves to support rigidly the rod bearing a point constituting a measuring projection.

As regards the adjustment of the projections, the constructions which have just been described have the drawback of requiring parts which are complicated and, therefore, costly. It must also be pointed out that the necessary time required by this adjustment is relatively considerable. Finally, on clamping the locking screw, there is always the risk of putting the projections out of adjustment.

In order to alleviate these disadvantages, there has already been proposed a measuring head in which the two projections are articulated something like a pair of dividers. Here, the axes of rotation of the projections are parallel to the axis of the cylinder to be ground. Once the points are in contact with the cylinder, the projections are locked. If this system has the advantage of permitting more rapid adjustment, it has the drawback of not sensing accurately the diameter of the part to be machined, since the measuring contact elements are no longer parallel, but form an angle between them. This leads to errors of measurement which are due to the inevitable variations in position existing between the measuring head and the part to be machined.

The document No. CH-A-626,991 describes, for its part, a rotary transducer for measuring position by contact by means of cranks coupled to devices measuring the angle of rotation of the said cranks. This system has the great disadvantage of needing pick-ups which permit measurement over an extensive range. Such pick-ups are costly and difficult to adjust.

In almost similar manner, the document U.S. Pat. No. 3,391,463 proposes a feeler consisting of an arm and a rod in the form of a roller. The arm is mounted to pivot on an axis. It is a question in this case of the conversion of a rotary movement into a linear movement. Examination of the document makes it obvious that the measuring range is extremely limited, which is not the case in the present invention, as will be seen hereinafter.

SUMMARY OF THE INVENTION

In order to obviate the above-mentioned disadvantages and provide a measuring head which can be adjusted relatively rapidly at the same time as its measuring contact elements remain parallel to each other, the present invention is characterised by the fact that each of the measuring projections is a crank comprising an arm and a cylindrical rod forming a measuring contact element. The arm is attached at a pivotal axis to the corresponding block by adjusting means, whereby the arm can be fixed to the block at an adjusted position about its pivotal axis. The pivotal axes of the arms and the rods are all parallel to each other. Accordingly the rods remain parallel to each other whatever the angle of adjustment of each of the arms.

BRIEF DESCRIPTION OF THE DRAWINGS

The invention will now be understood in the light of the description which follows and for the understanding of which reference will be made, by way of example, to the drawing, in which.

DESCRIPTION OF PREFERRED EMBODIMENT

Figure 1:
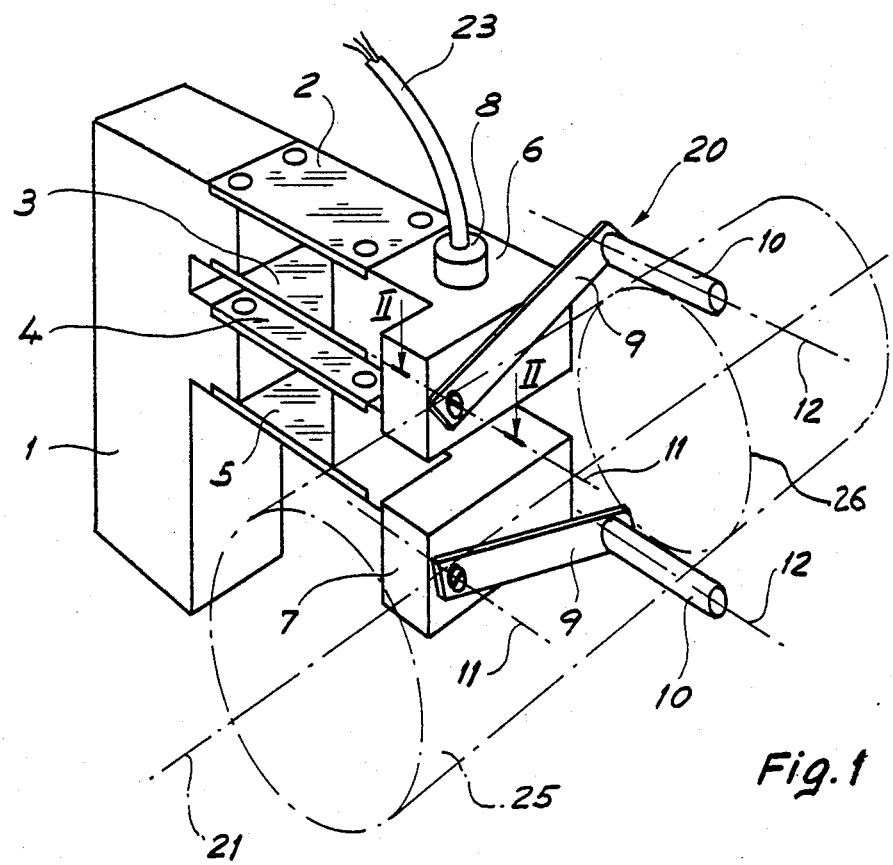
FIG. 1 is a perspective view of the measuring head equipped with projections according to the invention.

FIG. 1 shows the measuring head equipped with the projections or noses according to the invention. To the support or back 1 of the measuring head, which support is fixed normally to the table of the grinding machine, there are attached by means of the leaf springs 2, 3, 4 and 5 an upper block 6 and a lower block 7, respectively. Thus, the leaf springs 2 and 3 form a spring parallelogram with the back 1 and the block 6. The same is the case with the leaf springs 4 and 5, which form with the back 1 and the block 7 another spring parallelogram. It will be understood that in this construction the blocks 6 and 7 always remain aligned with one another whatever the distance which separates them. This distance is measured by a pick-up or transducer 8 which converts the mechanical travel into an electric signal picked up on the cable 23. The pick-up, which is preferably capacitive, comprises a first armature fast with the block 6 and a second armature which can move inside the first and is provided with a contact point which follows the mvoements of the block 7. This arrangement is known from prior art. Likewise according to this prior art, the blocks 6 and 7 are each provided with a measuring projection, of which two embodiments known from the state of the art have been described above. These projections rest on the part of which the diameter is to be gripped.

As is apparent in FIG. 1, the present invention proposes the use of cranks 20 as measuring projections. Each crank comprises an arm 9 and a cylindrical rod 10, the said rod forming a measuring contact element. The arms 9 are attached at the locations of their pivotal axes 11 to an upper block 6 and a lower block 7, respectively. In order to be able to adjust the rods to the diameter of the part to be measured 25, means are provided for the angular adjustment and the fixing of each of the arms on the correpsonding block.

A fundamental aspect of the invention resides in the fact that the pivotal axes 11 of the arms 9 are parallel to each other, the axis 12 of each of the cylindrical rod 10 being disposed parallel to the pivotal axis 11 of the arm 9 of which it forms part. In this way, the rods always remain parallel to each other whatever the angle of rotation of each of the arms. In this way, the same dimensions or size will always be measured, whatever the distance which separates the measuring head from the part to be machined. This arrangement is particularly well suited in systems where the nominal dimension is given by a reference part or a standard cylindrical part. The value displayed by the measuring head then represents the difference between the part measured and the nominal value.

In the case where it is desired to measure the diameter of a cross section of the part to be measured and which is shown in FIG. 1 by the circle 26, several conditions of construction and arrangement will have to be fulfilled. First, the arms 9 will have to be of equal lengths. Then, the axis 21 of the part to be measured will have to be arranged perpendicularly to a plane containing the pivotal axes 11 of the arms. Finally, the axis 21 will have to be located at an equal distance form the pivotal axes 11 of the arms.

Figure 2:
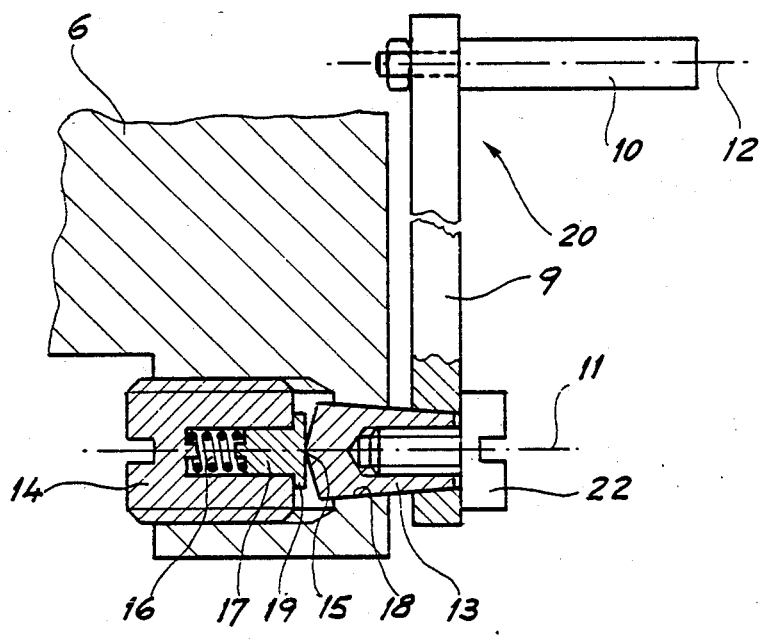
FIG. 2 is a view in section on the line II—II of FIG. 1 and shows a detail of construction according to a preferred version of the invention.

FIG. 2 is a view in section on the line II—II of FIG. 1 and shows a detail of construction according to a preferred version of the invention. In this construction, the means for the angular adjustment and then the fixing of each of the cranks comprise a conical joint for the arm 9 on the corresponding block 6, an identical construction being adopted for the block 7 (not shown). FIG. 2 also shows that the fixing of the arm 9 on the block 6 is ensured by a clamping screw 14 which acts in the direction of the rotation axis 11 of the arm 9.

More particularly, FIG. 2 shows that the conical joint comprises a conical pivot 13 fast with the arm 9 and coaxial with its axis of rotation 11, and a conical bearing 18 integral with the block 6 for receiving the said conical pivot 13. It will be understood that by tightening the screw 14 the friction is increased between the pivot and bearing in such manner that the whole of the crank 20 is clamped to the block 6.

In order to minimize the torque exerted on the conical pivot 13 as much as possible when the screw 14 is tightened, FIG. 2 shows that the said pivot terminates in a point 15 on which the clamping screw 14 acts. In this way, putting out of adjustment of the angular position of the arm 9 when the clamping screw is tightened is avoided. It will be mentioned that the invention is not limited to this embodiment and it will be understood that the end of the screw 14 could bear the point 15, which would enable the same result to be obtained.

The invention further proposes means for maintaining the conical pivot 13 in gentle frictional contact with the conical bearing 18 when the clamping screw 14 is slackened. To this end, FIG. 2 shows a stud 17 with a bearing 19 which is capable of sliding resiliently inside the clamping screw 14 and along its axis under the action of the restoring force of a spring 16. It is the stud 17 which then acts on the point 15 of the conical pivot 13. When the screw 14 is clamped, the stud 17 bears hard on the point 15, retained as it is by the bearing 19. When the screw is slackened, the stud still remains bearing against the point, but with a weaker force. The arm of the crank can then be moved angularly, the pivot still remaining adjusted without play in its seat, which maintains the parallelism of the handles 10, even during the stage of adjustment of the cranks.

Finally, as shown in FIG. 2, advantage is taken of the conical pivot 13 to fit onto it the arm 9 of the crank, which therefore bears a corresponding seat. According to the embodiment shown in the drawing, in order to fix the arm on the pivot, use is made of another clamping screw 22. This construction enables the arm to be detached very easily from the pivot for the purpose of its replacement, at the same time as it proposes a simplified construction, since the same conical surface serves at one and the same time as a means of jointing the crank to the blocks 6 and as a means of fixing the arm of the said crank on the said jointing means.

In relation to the solutions already known, the invention which has just been described brings the advantage of rapid adjustment while ensuring precise measurement of the part to be machined and this whatever the nominal diameter of this part and the position of the measuring head with respect to the said part. The rapid adjustment is appreciated above all when there is reason to change parts frequently. On this point, the proposed head allows great flexibility in manufacturing workshops.

We claim:

1. Measuring head for measuring diameters of cylindrical parts, comprising a support, an upper block and a lower block which are attached flexibly to said support and arranged to be able to move away from or nearer to one another while remaining aligned with one another, a transducer for measuring the distance between the blocks, and two measuring projections for resting on the cylindrical part to be measured, said projections being fast with said upper block and said lower block respectively, each of said measuring projections comprising a crank with an arm and a cylindrical rod projecting therefrom to form a measuring contact element, said arm being attached at a pivotal axis to the corresponding block by adjusting means whereby said arm can be fixed to said block at an adjusted position about said pivotal axis, said pivotal axes of said arms being parallel to each other and to said rods, whereby said rods remain parallel to each other whatever the angle of adjustment of each of said arms.

2. Measuring head according to claim 1, wherein said arms are of equal lengths and the axis of the part to be measured is disposed perpendicular to a plane containing said pivotal axes of said arms and equidistant from said pivotal axes.

3. Measuring head according to claim 1, wherein each said adjusting means comprise a conical joint for said arm on said corresponding block, and a clamping screw for tightening said joint.

4. Measuring head according to claim 3, wherein each said conical joint comprises a conical pivot fast with said arm and coaxial with its pivotal axis, and a conical bearing integral with said corresponding block and arranged to receive said conical pivot, said pivot terminating in a point on which said clamping screw acts to force said pivot into said bearing.

5. Measuring head acccording to claim 4, wherein said clamping screw comprises biasing means for maintaining said conical pivot in gentle frictional contact with said conical bearing when said clamping screw is slackened.

6. Measuring head according to claim 5, wherein said biasing means comprise a stud sliding in said clamping screw and a spring urging said stud to act on said point of said conical pivot.

7. Measuring head according to claim 4, wherein each said arm is fitted directly but detachably on to said conical pivot.

8. Measuring head according to claim 7, comprising a second clamping screw drawing said conical pivot into a set in said arm.

* * * * *